United States Patent [19]  [11] 4,282,119
Tinkelenberg et al.  [45] Aug. 4, 1981

[54] MANUFACTURE OF CHIPBOARD HAVING HIGH STRENGTH AND REDUCED FORMALDEHYDE EMISSION, USING A MINOR AMOUNT OF PROTEIN IN COMBINATION WITH LOW FORMALDEHYDE:UREA RESINS

[75] Inventors: Arie Tinkelenberg, Limbricht; Henricus W. L. M. Vaessen, Wijnandsrade; Kwai W. Suen, Geleen; Anton J. Van Doorn, Steenderen, all of Netherlands

[73] Assignee: Methanol Chemie Nederland V.o.F., Haren, Netherlands

[21] Appl. No.: 104,761

[22] Filed: Dec. 18, 1979

[30] Foreign Application Priority Data

Dec. 20, 1978 [NL] Netherlands ......................... 7812336

[51] Int. Cl.³ ..................... C08L 61/24; C08L 97/02
[52] U.S. Cl. ........................................ 260/6; 260/17.3
[58] Field of Search ............................................. 260/6

[56] References Cited
U.S. PATENT DOCUMENTS 3,471,420  10/1969  Campbell .................................. 260/7
3,598,773  10/1971  Mittchell et al. ......................... 260/6

FOREIGN PATENT DOCUMENTS 2332859  8/1977  France .

OTHER PUBLICATIONS

Chem. Absts., vol. 64:2279c, CIBA, Particle Board.
Chem. Absts., vol. 64:3799e, Kolodkine, Binders for Particle Board.
Chem. Absts., vol. 64:17818f, Herberts and Co.–Veneer Binder.
ABIPC, vol. 37, No. 7, 1/67, #5530–Improvements . . . Particle Boards, Rayner, C.A.A.

Primary Examiner—Earl A. Nielsen
Attorney, Agent, or Firm—Cushman, Darby & Cushman

[57] ABSTRACT

Chipboard showing a strongly reduced formaldehyde-emission is prepared on the basis of cellulose-containing material with a urea-formaldehyde or urea-melamine-formaldehyde resin as a binder, wherein said binder contains 0.45 to 0.65 mole of formaldehyde per mole-equivalent of amino groups and to which between 2 and 20% by wt., relative to the resin, of a protein soluble or dispersible in the resin solution has been added. The resin preferably contains between 25 and 45% by wt. of melamine, relative to the combined amount of urea and melamine. The boards have good strength and weather resistance, and have a very low formaldehyde emission.

6 Claims, No Drawings

MANUFACTURE OF CHIPBOARD HAVING HIGH STRENGTH AND REDUCED FORMALDEHYDE EMISSION, USING A MINOR AMOUNT OF PROTEIN IN COMBINATION WITH LOW FORMALDEHYDE:UREA RESINS

The invention relates to a method for the manufacture of board material with a very substantially lowered formaldehyde emission.

It is known that board sheets can be manufactured by compression of cellulose-containing material with urea formaldehyde or urea melamine formaldehyde resin as bonding agent. However, a sheet of fibre board or chipboard produced in this manner emits minor quantities of formaldehyde into the air for a very long time. The formaldehyde emission from the board material can be reduced by lowering the quantity of formaldehyde relative to the amino compounds in the adhesive. It has been found, though, that this lowering of the formaldehyde content of the adhesive is subject to certain limits because it leads to reduction of the strength properties of the sheets, in particular as regards the moisture and weather resistance of the sheet, as reflected in, inter alia, the V-100 value measured in accordance with DIN 68763. It has appeared that the 'boiling water resistance', measured as V-100 tensile strength, is in most cases still acceptable if the formaldehyde content, in terms of moles of formaldehyde per mole equivalent of amino group ($F/NH_2$), is lowered to about 0.65. When using an adhesive with an $F/NH_2$ molar ratio lower than 0.65, a strongly decreased V-100 value is found. The $F/NH_2$ molar ratio of 0.65 is regarded as a limit value, below which the V-100 value decreases very strongly and it is impossible in practice to obtain weather-resistant chipboard of good quality.

The object of the invention is the manufacture of board material with good mechanical properties and a very low formaldehyde emission.

According to the invention, board material is manufactured by compression at elevated temperature and pressure of cellulose-containing material with an aminoplast resin on the basis of formaldehyde, urea and optionally melamine as bonding agent to form a sheet, using an aminoplast resin which contains 0.45 to 0.65 mole of formaldehyde per mole equivalent of amino groups and to which between 2 and 20% by wt., relative to the resin, of a protein dissoluble or dispersible in the resin solution has been added.

The invention may be applied to the manufacture of board material with reduced formaldehyde emission and favourable strength properties, using urea formaldehyde resin as bonding agent. In order to obtain truly weather-resistant chipboard sheets, however, a urea melamine formaldehyde resin must be used as bonding agent.

In a preferred mode of realization of the invention therefore, the bonding agent used is an aminoplast resin which contains between 25 and 45% by wt. of melamine relative to the quantity of urea plus melamine. Further elucidation, then, will mainly relate to the application of urea melamine formaldehyde resins.

The addition of a protein which is dissoluble or dispersible in the resin solution appears to have an unexpectedly strong positive effect on the weather resistance of the chipboard, if a resin with an extremely low $F/NH_2$ molar ratio is used. It was known that the weather resistance of chipboard can be improved by combining proteins with an aminoplast adhesive. With the commonly used adhesives, having an $F/NH_2$ molar ratio of between 0.70 and 0.85, the addition of a protein produces only a limited non-essential improvement. The applicant has found that addition of proteins to adhesives with a very low $F/NH_2$ molar ratio gives a much more substantial improvement. In one extreme case it has even proved possible to produce chipboard with an acceptable V-100 tensile strength by addition of 10% by wt. of protein to an adhesive which without this addition yielded chipboard with a V-100 tensile strength of nearly nil.

According to the invention, chipboard with a unique combination of extremely low formaldehyde emission and good mechanical strength and weather resistance can be produced with an aminoplast resin as bonding agent. Other advantages are that no modifications in the production process are required and that proteins suitable as additive are commercially available at low prices. The weather resistance is so high that in virtually all cases no additional modification of the adhesive, with phenol, resorcinol or a phenol formaldehyde resin for instance, is required.

The additive used in the method according to the invention is a protein which is dissoluble or dispersible in the resin solution. Suitable proteins are albumins such as blood albumin desiccated blood, globulins, casein, hydrolized sludge from effluent water treatment plants and, possibly, partially hydrolized cell material obtained from cultures of micro organisms. In view of its price and ample availability, blood albumin is used by preference. The quantity used can be between 2 and 20% by wt. relative to the resin solids. The best results are obtained with a quantity of between 5 and 10% by wt. The protein is preferably mixed into the resin solution shortly before processing and distributed uniformly by stirring. In most cases the protein need only be dispersed in the solution.

As bonding agent or adhesive, an aminoplast resin is used which can be obtained in a known manner by condensation of formaldehyde with urea and possible melamine, or by mixing of a urea formaldehydr resin with a melamine formaldehyde resin, or by addition, either with or without heating, of an extra quantity of urea to a urea (melamine) formaldehyde resin solution. A frequently used method of preparation consists in condensation of formaldehyde with urea in a ratio of between 1.8:1 and 2.5:1 in a neutral to basic medium, followed by condensation in a weakly acid medium, and subsequent condensation in a neutral to basic medium with supply of additional amounts of urea and melamine. The desired $F/NH_2$ ratio may also be reached by adding urea to a commercially available resin with a higher $F/NH_2$ ratio. The effective $F/NH_2$ molar ratio is calculated on the basis of the quantity of amino groups used in the preparation of the adhesive, which can be calculated from the quantities of urea, melamine and any other aminoplast-forming additives used, such as dicyandiamide, thiourea, biuret, quanidine, ammonia, etc. One mole of ammonia is equated with two mole equivalents of amino groups in this calculation. The bonding agent used according to the invention should contain 0.45 to 0.65 mole of formaldehyde per mole equivalent of amino groups. With an $F/NH_2$ ratio of between 0.45 and 0.55, the weather resistance and the mechanical strength of the chipboard are on the low side, although still very much higher than those of chipboard with comparable formaldehyde emission not produced in accordance with the invention. To reach an optimum combination of strength and low formaldehyde emission, a bonding agent is preferably used which contains 0.55 to 0.60 mole of formaldehyde, per mole equivalent of amino groups. Besides formaldehyde, the adhesive may also contain another aldehyde, such as acetaldehyde, crotonaldehyde or isobutyraldehyde.

The resin solution and/or the materials to be bonded may further contain the usual additives, such as moisture repellants, anit-foaming agents, fungicides and other agents inhibiting microbial decomposition. The resin solution, with the protein mixed into it, is diluted with water, if necessary, to such a degree that it becomes properly sprayable. The resin content is then mostly about 50 to 60% by wt. Before, during or after the admixture of the protein, a hardening catalyst is added to the resin. Mostly this is a latent catalyst, such as ammonium chloride, optimally in combination with ammonia.

It is also possible to use adhesives containing a phenol or a phenol resin. For the preparation of resin solutions, reference is made to the relevant literature.

Manufacture of the board material takes place in a known manner. The cellulose-containing material, such as wood chips and fibres, is sprayed with the resin solution and formed into a chip mat by spreading it on a suitable substrate. The chip mat is then densified and hardened at a temperature of between 150° and 200° C. and a maximum pressure of about 3.5 N/mm$^2$. For a more detailed description of current methods, reference may be made to, for instance, 'Technologie der Spanplatten' by H. J. Deppe and K. Ernst, Stuttgart 1964.

The invention will now be elucidated by means of the following example, without being restricted to the mode of realization described therein.

EXAMPLE I

With application of a commercially available cocondensate of urea, melamine and formaldehyde (the adhesive resin UMF 032, from Methanol Chemie Nederland), which has an F/NH$_2$ ratio of 0.8, chipboard adhesives with a lower F/NH$_2$ ratio are prepared by adding to the initial resin solution certain quantities of urea and heating the mixtures for 5 minutes at 70° C. In this manner, the adhesives A to E were obtained. A quantity of 10% by wt. of blood albumin, relative to the quantity of the resin, was mixed into each of the adhesives by stirring. The adhesives were subsequently mixed with an accelerator system (1.5% by wt. of ammonium chloride and 0.5% by wt. of 25% ammonia, relative to the resin solids) and a moisture repellant (0.6% by wt. of Mobilcer paraffin emulsion, relative to the dry chip weight (atro) and diluted with water to the viscosity desirable in view of spraying.

The bonding agent solutions thus obtained are used for the manufacture of approximately 16 mm thick chipboard from dust-free wood chips (70% by wt. of fir, 30% by wt. of beech). To this effect, the chips are sprayed with the bonding agent solution in a suitable mixer (Lödige) and then spread out into a mat, which is compressed into 40×40 cm sheets with a density of about 720 kg/m$^3$ at a compression temperature of 180° C., with a compression time of 13 seconds per mm thickness and a maximum compression force of 3.4 N/mm$^2$. The V-100 tensile strength of the sheets, i.e. the tensile strength normal to the sheet surface after suubmersion for 2 hours in boiling water, was measured in accordance with DIN 68763. The formaldehyde emission was determined in accordance with the modified WKI (Roffael) method. In this method, a chipboard sample is suspended over a saturated solution of common salt in a bottle at 40° C. The salt solution is renewed at given intervals of 24, 24, 120, 24 and 24 hours. The total quantity of formaldehyde absorbed into the salt solutions is determined and expressed in mg of formaldehyde per m$^2$ of chipboard.

The properties of the adhesives A to E and of the chipboard sheets produced therewith are summarized in the table.

II. COMPARATIVE TESTS

Example I was repeated, with the difference that no blood albumin was added to the adhesive and that also an adhesive with an F/NH$_2$ ratio of 0.70 was prepared. The adhesives (K$^x$ to P$^x$) were also used for the manufacture of chipboard.

The results obtained are also summarized in the table.

TABLE

| test | type of adhesive | F/NH$_2$ | blood albumin wt.% | adhesive wt.% rel. to atro chip wt. | V-100 tensile strength N/mm$^2$ | F-emission mg/m$^2$ |
|---|---|---|---|---|---|---|
| 1 | A | 0.8 | 10 | 14 | 0.43 | 4800 |
| 2 | B | 0.65 | 10 | 14 | 0.36 | 1700 |
| 3 | C | 0.60 | 10 | 14 | 0.30 | 1350 |
| 4 | D | 0.55 | 10 | 14 | 0.24 | 950 |
| 5 | E | 0.50 | 10 | 14 | 0.20 | 450 |
| 6 | K* | 0.80 | — | 13 | 0.34 | 5000 |
| 7 | L* | 0.70 | — | 14 | 0.32 | 2200 |
| 8 | M* | 0.65 | — | 14 | 0.24 | 1800 |
| 9 | N* | 0.60 | — | 14 | 0.18 | 1400 |
| 10 | O* | 0.55 | — | 15 | 0.10 | 1000 |
| 11 | P* | 0.50 | — | 15 | 0.04 | 500 |

*comparative tests.

We claim

1. In the manufacture of chipboard material by hardening at elevated temperature and pressure of cellulose-containing material with an aminoplast resin on the basis of formaldehyde, urea and optionally melamine as bonding agent to form a sheet, the improvement of using in combination an aminoplast resin which contains 0.45 to 0.65 mole of formaldehyde per mole equivalent of amino groups and to which between 2 and 20% by wt., relative to the resin, of a protein, dissoluble or dispersible in the resin solution, has been added.

2. Method according to claim 1, wherein an aminoplast resin is used which contains 25 to 45% by wt. of melamine relative to the quantity of urea plus melamine.

3. Method according to claim 1 or 2, wherein an aminoplast resin is used which contains 0.55 to 0.60 mole of formaldehyde per mole equivalent of amino groups.

4. Method according to claim 1, wherein 5 to 10% by wt. of protein, relative to the quantity of aminoplast resin, is present.

5. Method according to claim 1, wherein the protein used is blood albumin.

6. The chipboard product obtained by the method according to claims 1, 2, 4 or 5.